3,015,633
MANUFACTURE OF THERMISTORS
Michel Humbert and Jacques Floriot, Paris, France, assignors to Compagnie Generale de Telegraphie Sans Fil, a corporation of France
No Drawing. Filed Jan. 2, 1958, Ser. No. 706,539
Claims priority, application France Jan. 23, 1957
6 Claims. (Cl. 252—519)

The present invention relates to substances of the type generally called thermistors i.e. substances basically composed of metal oxides, the electrical resistance properties of which present a negative temperature coefficient. These thermistors are generally put in the shape of small rods, pellets, wafers, etc. of small dimensions, and they are capable of carrying low powers, of the order of 2 watts.

For higher powers, especially when suddenly applied, one or several hot points occur inside the thermistor, at points of lower electrical resistance, which may cause the break-down of the thermistor.

If, however, the dimensions of the thermistor are increased, the thermal time constant then becomes an important factor and an obstacle in certain applications, such as voltage control, absorption of large current when suddenly applied etc. Moreover, the formation of hot points and the break-down of the thermistor are enhanced by the tight, heterogeneous texture of the thermistor as known in the art.

Thermistors consist generally of combinations of certain metal oxides, such as: oxides of iron, nickel, cobalt, copper, vanadium, tungsten, titanium, aluminum etc. The metal oxides chosen, in the form of powder of suitable grain size, are shaped with a binder, such as rubber urea, ceresin, etc. and sintered at high temperature.

The present invention has for its object to provide a new process for the manufacture of thermistors of the above outlined type, the resulting thermistors being capable of withstanding much higher powers than those known in the art, for instance 10 to 20 times higher for the same dimensions.

Another object of the invention is to provide a "power" thermistor obtained by the above process, and essentially consisting of a porous material formed by an aggregation of small thermistors elements, associated in series or in parallel.

The process according to the invention consists in grinding and finely sifting a thermistor substance prepared according to the known art; shaping said substance with an organic binder; and firing the product obtained at a temperature which is at least 5% lower than the temperature of the sintering treatment used in the production of the above starting thermistor substance.

According to a preferred embodiment, before the shaping step, there is added an enamel or glass having a melting point lower than said firing temperature.

The starting thermistor substance, the grinding of which constitutes the first phase of the said process, is a thermistor of any known type obtained according to the prior art, for instance one of the substances described in U.S. Patent applications Serial No. 339,406, now abandoned, and 341,304, now U.S. Patent 2,720,741, respectively filed on the 27th of February and the 9th of March 1953.

A certain number of specific examples of the composition of such a thermistor are given hereinafter, but it should be clearly understood that the process according to the invention may be applied to any thermistor substance with a view to increasing the maximum power it can withstand without break-down.

The organic binder used in the process of the invention may be any of the binders currently used in the manufacture of ceramics, such as Rhodoviol, rubber, etc. which disappear during the firing process.

It has been found that the resulting product is composed of an agglomerate of a very large number of small thermistors.

The invention will be best understood from the specific example given hereinafter:

EXAMPLE

The basic substance for the manufacture of the thermistor according to the invention is a thermistive substance obtained from former conventional thermistors or prepared according to the conventional method as described hereinafter:

The following substances are crushed with distilled water during approximately nine hours:

|  | G. |
|---|---|
| $MnO_2$ | 3,360 |
| NiO | 540 |
| $Co_2O_3$ | 1,950 |
| $CO_3Cu$ | 780 |
| Alumina | 252 |

Upon evaporation at a temperature of 120°, the product is dried and passed through a 100-mesh sieve and wheaten flour is added thereto to serve as a binder. The product is then shaped, for instance by extrusion, so as to obtained rods which are dried and cut into pieces. These rods are then fired at a temperature of 1050° C. during 3 hours, yielding a thermistor substance having a resistivity of the order of 320 ohms-cm./cm.$^2$. This thermistor substance is thereupon subjected to the process of the invention, which comprises the following steps:

The substance is crushed during 150 hours, passed through a 100-mesh sieve and lead borate incorporated thereto, the melting point of which is at a temperature of about 700° C. The nature of this enamel and the percentage employed will be specified hereinafter. The mixture of thermistive powder and enamel is thoroughly mixed, adding thereto a binder containing, for instance, a solution of rubber in trichlorethylene. Drying is then effected at a temperature lower than 80° C. and the product passed through a 70-mesh sieve. Shaping takes place, for instance by pressure, and firing is carried out in refractory seggers, at a temperature lower than 1000° C., as will be shown hereinafter.

The power thermistor thus obtained is then coated with silver according to a well known process.

Various tests have been carried out in order to establish the effect of the nature of the enamel and of the percentage thereof, as well as that of the second firing temperature on the properties of the thermistor.

By using, for instance, with the composition and the method specified hereinabove, a lead borate enamel, with a lead contents higher than 50%, it has been found that for an enamel percentage by weight of 3% in the composition, the resistivity is 430 ohm-cm./cm.$^2$ and the temperature coefficient, at 25° C., of −3.7% ° C., the second firing temperature being 750° C.

A thermistor having a diameter of 60 mm. and 5 mm. thick, obtained according to the above described method, has been capable of absorbing a peak power of 1350 watts (by way of comparison, a thermistor having the same dimensions, but produced according to a conventional process, was unable, to absorb, under the same conditions, a peak power higher than 500 watts).

For a second firing temperature of 900° C., the same thermistor showed a resistivity of 294 ohm-cm./cm.$^2$ at 25° C., presented a temperature coefficient of −3.7%/° C. at 25° C. and was capable of absorbing a peak power of 2.400 watts without breaking down.

By varying the enamel proportion, the other parameters remaining constant, the following results have been obtained (under a second firing temperature of 900° C.):

| Enamel proportion | 0% | 1% | 3% | 5% | 10% |
|---|---|---|---|---|---|
| Contraction of thermistor under firing, percent | 1.55 | 3.8 | 4 | 4 | 4 |
| Resistivity in ohm-cm./cm.$^2$ at 25° C | 1,420 | 290 | 294 | 300 | 360 |
| Temperature coefficient in percent per ° C. (at 25° C.) | −3.95 | −3.7 | −3.7 | −3.7 | −3.71 |
| Absorbed peak power without break-down, in watts | 450 | 2,400 | 2,400 | 2,400 | 2,400 |

It has been further established that the enamel caused a substantial reduction in the dispersion of the resistivity values from one sample to another.

It is to be understood that the example specified above is in no way limiting and that the thermistor substance subjected to the process of the invention may have very different compositions from that given in the example described.

What we claim is:

1. A process of manufacturing thermistors comprising the steps of sintering at a temperature higher than 1000° C., a mixture of an organic binder and powdered metallic oxides selected from the group consisting of titanium, vanadium, manganese, iron, cobalt, nickel, copper and aluminum oxides whereby a first thermistor is obtained; of grinding said first thermistor into a fine powder, of shaping said powder with a lead borate enamel, the melting point of which is lower than 1000° C. to provide a shaped object and subjecting the shaped object to a sintering treatment, at a temperature at least 5% lower than the temperature used in the manufacture of said first thermistor.

2. A process of manufacturing thermistors comprising the steps of sintering at a temperature higher than 1000° C., a mixture of an organic binder and powdered metallic oxides selected from the group consisting of titanium, vanadium, manganese, iron, cobalt, nickel, copper and aluminum oxides whereby a first thermistor is obtained; of grinding said first thermistor into a fine powder; of shaping said powder with an organic binder and lead-borate enamel, the melting point of which is lower than 1000° C., to provide a mixture and subjecting the shaped mixture to a sintering treatment, at a temperature at least 5% lower than the temperature used in the manufacture of said first thermistor.

3. A process as set forth in claim 2 in which the weight of lead borate enamel is not greater than 10% by weight of said powder.

4. A process of manufacturing thermistors, comprising the steps of shaping and sintering, at a temperature higher than 1000° C., a mixture of an organic binder and powdered oxides of manganese, nickel, cobalt, copper and aluminum, whereby a first thermistor is obtained; grinding said first thermistor into a fine powder; shaping a mixture of said powder with a lead-borate enamel having a lead content of at least 50% by weight, the weight of enamel not being more than 10% of the weight of said powder; and subjecting the shaped mixture to a sintering treatment at a temperature at least 5% lower than the temperature used in the manufacture of said first thermistor.

5. The process of claim 4 wherein the enamel constitutes about 5% by weight of the mixture comprising the ground thermistor and the enamel.

6. The process of claim 4 wherein the enamel constitutes about 3% by weight of the mixture comprising the ground thermistor and the enamel.

References Cited in the file of this patent

UNITED STATES PATENTS

| 2,179,960 | Schwarzkopf | Nov. 14, 1939 |
| 2,358,211 | Christensen et al. | Sept. 12, 1944 |
| 2,462,162 | Christensen et al. | Feb. 22, 1949 |
| 2,479,914 | Drugmand et al. | Aug. 23, 1949 |
| 2,700,220 | Torok | Jan. 25, 1955 |
| 2,786,819 | Smith et al. | Mar. 26, 1957 |

FOREIGN PATENTS

| 474,998 | Canada | July 3, 1951 |
| 618,966 | Great Britain | Mar. 2, 1949 |